(12) United States Patent
Ren et al.

(10) Patent No.: US 12,238,661 B2
(45) Date of Patent: Feb. 25, 2025

(54) SYNCHRONIZATION SIGNAL TRANSMITTING METHOD, TERMINAL AND APPARATUS, AND STORAGE MEDIUM

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 585 days.

(21) Appl. No.: 17/619,048

(22) PCT Filed: Jun. 30, 2020

(86) PCT No.: PCT/CN2020/099326
§ 371 (c)(1),
(2) Date: Dec. 14, 2021

(87) PCT Pub. No.: WO2021/004335
PCT Pub. Date: Jan. 14, 2021

(65) Prior Publication Data
US 2022/0361124 A1 Nov. 10, 2022

(30) Foreign Application Priority Data
Jul. 5, 2019 (CN) .......................... 201910603816.6

(51) Int. Cl.
*H04W 56/00* (2009.01)
(52) U.S. Cl.
CPC .............................. *H04W 56/0015* (2013.01)

(58) Field of Classification Search
CPC .......... H04W 56/0015; H04W 56/002; H04W 56/001; H04W 4/70; H04W 4/46;
(Continued)

(56) References Cited

U.S. PATENT DOCUMENTS

| | | | |
|---|---|---|---|
| 10,785,618 B2* | 9/2020 | Lee | H04L 5/1469 |
| 11,240,081 B2* | 2/2022 | Noh | H04B 7/0888 |

(Continued)

FOREIGN PATENT DOCUMENTS

| | | |
|---|---|---|
| CN | 101515824 A | 8/2009 |
| CN | 101841507 A | 9/2010 |

(Continued)

OTHER PUBLICATIONS

International Search Report for PCT Application PCT/CN2020/099326 issued on Oct. 9, 2020, and its English Translation provided by WIPO.

(Continued)

*Primary Examiner* — Chi H Pham
*Assistant Examiner* — Vladislav Y Agureyev
(74) *Attorney, Agent, or Firm* — Ladas & Parry, LLP

(57) ABSTRACT

A method of transmitting a synchronization signal, a terminal, an apparatus for transmitting a synchronization signal, and a storage medium are provided. The method includes: generating a sidelink-primary synchronization signal sequence according to a formula $d_{PSS}(n)=1-2x(m)$ or $d_{PSS}(n)=d_u(n)$, and generating a sidelink-primary synchronization signal according to the sidelink-primary synchronization signal sequence; transmitting the sidelink-primary synchronization signal; or transmitting the sidelink-primary synchronization signal on a frequency resource different from a frequency resource occupied by an air-interface downlink-primary synchronization signal.

6 Claims, 2 Drawing Sheets

Generating an S-PSS sequence according to a specific polynomial, and generating an S-PSS according to the S-PSS sequence — 301

Transmitting the S-PSS — 302

(58) Field of Classification Search
CPC ....... H04J 2011/0096; H04J 2011/0073; H04J 13/0062; H04J 13/0025

See application file for complete search history.

(56) References Cited

U.S. PATENT DOCUMENTS

| | | | |
|---|---|---|---|
| 2015/0043545 A1 | 2/2015 | Cheng et al. | |
| 2016/0212721 A1 | 7/2016 | Sheng et al. | |
| 2016/0242131 A1 | 8/2016 | Popovic et al. | |
| 2017/0041894 A1 | 2/2017 | Lee et al. | |
| 2017/0078998 A1 | 3/2017 | Li | |
| 2017/0289935 A1 | 10/2017 | Yoon | |
| 2018/0123849 A1* | 5/2018 | Si | H04J 11/0073 |
| 2018/0302202 A1 | 10/2018 | Kim et al. | |
| 2018/0368087 A1* | 12/2018 | Jung | H04W 56/001 |
| 2019/0149365 A1 | 5/2019 | Chatterjee et al. | |
| 2020/0037268 A1* | 1/2020 | Zhang | H04W 52/367 |
| 2020/0275393 A1 | 8/2020 | Shin et al. | |
| 2021/0153146 A1* | 5/2021 | Liu | H04L 5/0048 |
| 2021/0167883 A1* | 6/2021 | Yoon | H04L 27/2607 |
| 2021/0168574 A1* | 6/2021 | Zhang | H04W 16/28 |
| 2021/0321348 A1* | 10/2021 | Ohara | H04W 72/30 |
| 2022/0140967 A1* | 5/2022 | Khoryaev | H04W 56/002 375/220 |

FOREIGN PATENT DOCUMENTS

| | | |
|---|---|---|
| CN | 106256099 A | 12/2016 |
| CN | 107736061 A | 2/2018 |
| CN | 108141340 A | 6/2018 |
| CN | 109314632 A | 2/2019 |
| CN | 110383906 A | 10/2019 |
| EP | 3066875 A1 | 9/2016 |
| WO | 2014035805 A1 | 3/2014 |
| WO | 2015067778 A1 | 5/2015 |
| WO | 2015168829 A1 | 11/2015 |
| WO | 2018062891 A1 | 4/2018 |
| WO | 2018084636 A1 | 5/2018 |
| WO | 2018161001 A1 | 9/2018 |
| WO | 2018188009 A1 | 10/2018 |
| WO | 20190105394 A1 | 6/2019 |
| WO | WO-2020221457 A1 * | 11/2020 |

OTHER PUBLICATIONS

Written Opinion for PCT Application PCT/CN2020/099326 issued on Oct. 9, 2020, and its English Translation provided by WIPO.

International Preliminary Report on Patentability for PCT Application PCT/CN2020/099326 issued on Jan. 11, 2022, and its English Translation provided by WIPO.

"Sidelink synchronization mechanisms for NR V2X," 3GPP TSG RAN WG1 Meeting #97, R1-1906012, Reno, USA, May 13-17, 2019, Agenda Item: 7.2.4.3, Source: Huwei, HiSilicon.

First Office Action for Chinese Patent Application 201910603816.6, issued on Jul. 2, 2021 and its English Translation provided by Chinese Patent Office.

"NR-primary Synchronization Signal(PSS)," Codeplayon (http://www.codeplayon.com/author/admin), Nov. 8, 2018.

"Discussion on Sidelink Synchronization for NR V2X," 3GPP TSG-RAN WG1 Meeting #95, R1-1813102, Spokane, USA, Nov. 12-16, 2018, Agenda item: 7.2.4.1.3, Source: ITRI.

"Considerations on sidelink synchronization for NR V2X," 3GPP TSG RAN WG1 Meeting #95,R1-1813493, Spokane, USA, Nov. 12-16, 2018, Agenda item: 7.2.4.1.3, Source: ITL.

First Office Action for Taiwanese Patent Application 109122341, issued on Apr. 23, 2021 and its English Translation provided by the applicant.

"Discussion on NR V2X Sidelink Synchronization mechanism," 3GPP TSG-RAN WG1 Meeting #97, R1-1906077, Reno, USA, May 12-17, 2019, Source: Nokia , Agenda item: 7.2.4.3, Nokia Shanghai Bell.

"Discussion on NR sidelink synchronization mechanism," 3GPP TSG RAN WG1 #97 Meeting, R1-1907016, Agenda item: 7.2.4.3, Source: LG Electronics.

* cited by examiner

US 12,238,661 B2

SYNCHRONIZATION SIGNAL TRANSMITTING METHOD, TERMINAL AND APPARATUS, AND STORAGE MEDIUM

CROSS-REFERENCE TO RELATED APPLICATIONS

This application is the U.S. national phase of PCT Application No. PCT/CN2020/099326 filed on Jun. 30, 2020, which claims a priority to the Chinese patent application No. 201910603816.6 filed in China on Jul. 5, 2019, the disclosures of which are incorporated herein by reference in their entireties.

TECHNICAL FIELD

The present disclosure relates to the field of communications technologies, and in particular, relates to a method of transmitting a synchronization signal, a terminal, an apparatus for transmitting a synchronization signal, and a storage medium.

BACKGROUND

In order to establish synchronization between terminals in New Radio (NR) vehicle-to-everything (intelligent connected vehicle technology, Vehicle-to-Everything (V2X); Internet of Vehicles) communication in the related art, a terminal is firstly required to transmit a synchronization signal in a sidelink, so as to establish synchronization between the terminals. A new m-sequence is employed for a Sidelink Primary Synchronization Signal (S-PSS) in the related art.

Shortcomings existing in the related art are that, false alarms or false detections occur when the new m-sequence is employed, and it further leads to a reduction in a probability of synchronization detection and an increase in synchronization delay.

SUMMARY

The present disclosure provides a method of transmitting a synchronization signal, a terminal, an apparatus for transmitting a synchronization signal, and a storage medium, so as to solve the problem of false alarms or false detections when the m-sequence is employed.

Some embodiments of the present disclosure provide a method for transmitting a synchronization signal. The method includes: generating an S-PSS sequence according to a specific polynomial, and generating an S-PSS according to the S-PSS sequence; transmitting the S-PSS; where generating the S-PSS sequence according to the specific polynomial includes one or a combination of following:

generating an S-PSS sequence $d_{PSS}(n)$ according to a formula $d_{PSS}(n)=1-2x(m)$, where $x(m)$ is generated based on a polynomial $x(i+7)=(x(i+4)+x(i))\bmod 2$, $m=(n+CS)\bmod 127$ where $0\le n<127$, n is a first sequence-numbering value, m is a second sequence-numbering value generated from n and CS, i is a third sequence-numbering value, CS is cyclic shift, and CS is a positive integer not equal to 0, 43 and 86; or, generating an S-PSS sequence $d_{PSS}(n)$ according to a formula $d_{PSS}(n)=1-2x(m)$, where $x(m)$ is generated based on a polynomial $x(i+7)=(x(i+1)+x(i))\bmod 2$, $m=(n+CS)\bmod 127$ where $0\le n<127$, n is a first sequence-numbering value, m is a second sequence-numbering value generated from n and CS, i is a third sequence-numbering value, CS is cyclic shift; or generating an S-PSS sequence $d_{PSS}(n)$ according to a formula $d_{PSS}(n)=d_u(n)$, where $$d_u(n) = \begin{cases} e^{-j\frac{\pi u n(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, where $0\le u<127$; or transmitting the S-PSS synchronization signal on a frequency resource different from a frequency resource occupied by an air-interface downlink-primary synchronization signal (DL-PSS), where the air-interface DL-PSS is transmitted by a base station to a terminal, and the S-PSS is transmitted by a terminal to another terminal.

In an embodiment, when x(m) is generated based on the polynomial $x(i+7)=(x(i+4)+x(i))\bmod 2$, a value of m is taken in one of following ways:

$m=(n+43\times N_{ID}^{(2)}+d1)\bmod 127$, i.e., $CS=43\times N_{ID}^{(2)}+d1$, where $N_{ID}^{(2)}$ is an index value of the S-PSS sequence, d1 is a positive integer; or, $m=(n+(43+d2)\times N_{ID}^{(2)}+d3)\bmod 127$, i.e., $CS=(43+d2)\times N_{ID}^{(2)}+d3$, where $N_{ID}^{(2)}$ is an index value of the S-PSS sequence, both d2 and d3 are positive integers; or, $m=(n+(43-d4)\times N_{ID}^{(2)}+d5)\bmod 127$, i.e., $CS=(43-d4)\times N_{ID}^{(2)}+d5$, where $N_{ID}^{(2)}$ is an index value of the S-PSS sequence, both d4 and d5 are positive integers; or, $m=(n+43\times(N_{ID}^{(2)}+d6))\bmod 127$, i.e., $CS=43\times(N_{ID}^{(2)}+d6)$, where $N_{ID}^{(2)}$ is an index value of the S-PSS sequence, d6 is a positive integer; or, $m=(n+43\times\{N1,N2\})\bmod 127$, i.e., $CS=43\times\{N1,N2\}$, where N1 and N2 correspond to two index values $N_{ID}^{(2)}$ of the S-PSS sequence, and N1 and N2 correspond to two cyclic shifts of an m-sequence employed for the S-PSS; or, $m=(n+X1)\bmod 127$, i.e., $CS=\{X1\}$, where X1 corresponds to an index value $N_{ID}^{(2)}$ of the S-PSS sequence, and X1 corresponds to a cyclic shift of an m-sequence employed for the S-PSS; or, $m=(n+\{X2,X3\})\bmod 127$, i.e., $CS=\{X2,X3\}$, where X2 and X3 correspond to two index values $N_{ID}^{(2)}$ of the S-PSS sequence, respectively, and X2 and X3 correspond to two cyclic shifts of an m-sequence employed for the S-PSS, respectively; or, $m=(n+\{X4,X5,X6\})\bmod 127$, i.e., $CS=\{X4,X5,X6\}$, where X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively.

In an embodiment, when x(m) is generated based on the polynomial $x(i+7)=(x(i+1)+x(i))\bmod 2$, a value of m is taken in one of following ways:

$m=(n+43\times N_{ID}^{(2)}+d1)\bmod 127$, i.e., $CS=43\times N_{ID}^{(2)}+d1$, where $N_{ID}^{(2)}$ is an index value of the S-PSS sequence, d1 is a positive integer; or, $m=(n+(43+d2)\times N_{ID}^{(2)}+d3)\bmod 127$, i.e., $CS=(43+d2)\times N_{ID}^{(2)}+d3$, where $N_{ID}^{(2)}$ is an index value of the S-PSS sequence, both d2 and d3 are positive integers; or, $m=(n+(43-d4)\times N_{ID}^{(2)}+d5)\bmod 127$, i.e., $CS=(43-d4)\times N_{ID}^{(2)}+d5$, where $N_{ID}^{(2)}$ is an index value of the S-PSS sequence, both d4 and d5 are positive integers; or, $m=(n+43\times(N_{ID}^{(2)}+d6))\bmod 127$, i.e., $CS=43\times(N_{ID}^{(2)}+d6)$, where $N_{ID}^{(2)}$ is an index value of the S-PSS sequence, d6 is a positive integer; or, m=(n+43×{N1,N2})mod 127, i.e., CS=43×{N1,N2}, where N1 and N2 correspond to two index values $N_{ID}^{(2)}$ of the S-PSS sequence, and N1 and N2 correspond to two cyclic shifts of an m-sequence employed for the S-PSS; or, m=(n+X1)mod 127, i.e., CS={X1}, where X1 corresponds to an index value $N_{ID}^{(2)}$ of the S-PSS sequence, and X1 corresponds to a cyclic shift of an m-sequence employed for the S-PSS; or, m=(n+{X2,X3})mod 127, i.e., CS={X2,X3}, where X2 and X3 correspond to two index values $N_{ID}^{(2)}$ of the S-PSS sequence, respectively, and X2 and X3 correspond to two cyclic shifts of an m-sequence employed for the S-PSS, respectively; or, m=(n+{X4,X5,X6})mod 127, i.e., CS={X4,X5,X6}, where X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively; or, m=(n+d6×$N_{ID}^{(2)}$)mod 127, i.e., CS=d6×$N_{ID}^{(2)}$, where $N_{ID}^{(2)}$ is an index value of the S-PSS sequence, d6 is a positive integer.

In an embodiment, the frequency resource includes one or a combination of following resources: a subcarrier, a resource block, a bandwidth part BWP, a carrier, a frequency band.

Some embodiments of the present disclosure provide a terminal, and the terminal includes: a processor, configured to read programs in a memory and perform following process: generating an S-PSS sequence according to a specific polynomial, and generating an S-PSS according to the S-PSS sequence; and a transceiver, configured to receive and transmit data under control of the processor and perform following process: transmitting the S-PSS;

where, generating the S-PSS sequence according to the specific polynomial includes one or a combination of following: generating an S-PSS sequence $d_{PSS}(n)$ according to a formula $d_{PSS}(n)=1-2x(m)$, where x(m) is generated based on a polynomial x(i+7)=(x(i+4)+x(i))mod 2, m=(n+CS)mod 127 where 0≤n<127, n is a first sequence-numbering value, m is a second sequence-numbering value generated from n and CS, i is a third sequence-numbering value, CS is cyclic shift, and CS is a positive integer not equal to 0, 43 and 86; or, generating an S-PSS sequence $d_{PSS}(n)$ according to a formula $d_{PSS}(n)=1-2x(m)$, where x(m) is generated based on a polynomial x(i+7)=(x(i+1)+x(i))mod 2, m=(n+CS)mod 127 where 0≤n<127, n is a first sequence-numbering value, m is a second sequence-numbering value generated from n and CS, i is a third sequence-numbering value, CS is cyclic shift; or, generating an S-PSS sequence $d_{PSS}(n)$ according to a formula $d_{PSS}(n)=d_u(n)$, where $$d_u(n) = \begin{cases} e^{-j\frac{\pi u n(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, where 0≤u<127; or transmitting the S-PSS on a frequency resource different from a frequency resource occupied by an air-interface downlink-primary synchronization signal (DL-PSS), where the air-interface DL-PSS is transmitted by a base station to a terminal, and the S-PSS is transmitted by a terminal to another terminal.

In an embodiment, when x(m) is generated based on the polynomial x(i+7)=(x(i+4)+x(i))mod 2, a value of m is taken in one of following ways:

m=(n+43×$N_{ID}^{(2)}$+d1)mod 127, i.e., CS=43×$N_{ID}^{(2)}$+d1, where $N_{ID}^{(2)}$ is an index value of the S-PSS sequence, d1 is a positive integer; or, m=(n+(43+d2)×$N_{ID}^{(2)}$+d3)mod 127, i.e., CS=(43+d2)×$N_{ID}^{(2)}$+d3, where $N_{ID}^{(2)}$ is an index value of the S-PSS sequence, both d2 and d3 are positive integers; or, m=(n+(43−d4)×$N_{ID}^{(2)}$+d5)mod 127, i.e., CS=(43−d4)×$N_{ID}^{(2)}$+d5, where $N_{ID}^{(2)}$ is an index value of the S-PSS sequence, both d4 and d5 are positive integers; or, m=(n+43×($N_{ID}^{(2)}$+d6))mod 127, i.e., CS=43×($N_{ID}^{(2)}$+d6), where $N_{ID}^{(2)}$ is an index value of the S-PSS sequence, d6 is a positive integer; or, m=(n+43×{N1,N2})mod 127, i.e., CS=43×{N1,N2}, where N1 and N2 correspond to two index values $N_{ID}^{(2)}$ of the S-PSS sequence, and N1 and N2 correspond to two cyclic shifts of an m-sequence employed for the S-PSS; or, m=(n+X1)mod 127, i.e., CS={X1}, where X1 corresponds to an index value $N_{ID}^{(2)}$ of the S-PSS sequence, and X1 corresponds to a cyclic shift of an m-sequence employed for the S-PSS; or, m=(n+{X2,X3})mod 127, i.e., CS={X2,X3}, where X2 and X3 correspond to two index values $N_{ID}^{(2)}$ of the S-PSS sequence, respectively, and X2 and X3 correspond to two cyclic shifts of an m-sequence employed for the S-PSS, respectively; or, m=(n+{X4,X5,X6})mod 127, i.e., CS={X4,X5,X6}, where X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively.

In an embodiment, when x(m) is generated based on the polynomial x(i+7)=(x(i+1)+x(i))mod 2, a value of m is taken in one of following ways:

m=(n+43×$N_{ID}^{(2)}$+d1)mod 127, i.e., CS=43×$N_{ID}^{(2)}$+d1, where $N_{ID}^{(2)}$ is an index value of the S-PSS sequence, d1 is a positive integer; or, m=(n+(43+d2)×$N_{ID}^{(2)}$+d3)mod 127, i.e., CS=(43+d2)×$N_{ID}^{(2)}$+d3, where $N_{ID}^{(2)}$ is an index value of the S-PSS sequence, both d2 and d3 are positive integers; or, m=(n+(43−d4)×$N_{ID}^{(2)}$+d5)mod 127, i.e., CS=(43−d4)×$N_{ID}^{(2)}$+d5, where $N_{ID}^{(2)}$ is an index value of the S-PSS sequence, both d4 and d5 are positive integers; or, m=(n+43×($N_{ID}^{(2)}$+d6))mod 127, i.e., CS=43×($N_{ID}^{(2)}$+d6), where $N_{ID}^{(2)}$ is an index value of the S-PSS sequence, d6 is a positive integer; or, m=(n+43×{N1,N2})mod 127, i.e., CS=43×{N1,N2}, where N1 and N2 correspond to two index values $N_{ID}^{(2)}$ of the S-PSS sequence, and N1 and N2 correspond to two cyclic shifts of an m-sequence employed for the S-PSS; or, m=(n+X1)mod 127, i.e., CS={X1}, where X1 corresponds to an index value $N_{ID}^{(2)}$ of the S-PSS sequence, and X1 corresponds to a cyclic shift of an m-sequence employed for the S-PSS; or, m=(n+{X2,X3})mod 127, i.e., CS={X2,X3}, where X2 and X3 correspond to two index values $N_{ID}^{(2)}$ of the S-PSS sequence, respectively, and X2 and X3 correspond to two cyclic shifts of an m-sequence employed for the S-PSS, respectively; or, m=(n+{X4,X5,X6})mod 127, i.e., CS={X4,X5,X6}, where X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively; or, $m=(n+d6\times N_{ID}^{(2)})\mod 127$, i.e., $CS=d6\times N_{ID}^{(2)}$, where $N_{ID}^{(2)}$ is an index value of the S-PSS sequence, d6 is a positive integer.

In an embodiment, the frequency resource includes one or a combination of following: a subcarrier, a resource block, a BWP, a carrier, a frequency band.

Some embodiments of the present disclosure provide an apparatus for transmitting a synchronization signal. The apparatus for transmitting the synchronization signal includes: a synchronization signal generation module, configured to generate a sidelink-primary synchronization signal (S-PSS) sequence according to a specific polynomial, and generate an S-PSS according to the S-PSS sequence; a transmission module, configured to transmit the S-PSS; where, generating the S-PSS sequence according to the specific polynomial includes one or a combination of following:

generating an S-PSS sequence $d_{PSS}(n)$ according to a formula $d_{PSS}(n)=1-2x(m)$, where x(m) is generated based on a polynomial $x(i+7)=(x(i+4)+x(i))\mod 2$, $m=(n+CS)\mod 127$ where $0\leq n<127$, n is a first sequence-numbering value, m is a second sequence-numbering value generated from n and CS, i is a third sequence-numbering value, CS is cyclic shift, and CS is a positive integer not equal to 0, 43 and 86; or, generating an S-PSS sequence $d_{PSS}(n)$ according to a formula $d_{PSS}(n)=1-2x(m)$, where x(m) is generated based on a polynomial $x(i+7)=(x(i+1)+x(i))\mod 2$, $m=(n+CS)\mod 127$ where $0\leq n<127$, n is a first sequence-numbering value, m is a second sequence-numbering value generated from n and CS, i is a third sequence-numbering value, CS is cyclic shift; or, generating an S-PSS sequence $d_{PSS}(n)$ according to a formula $d_{PSS}(n)=d_u(n)$, where $$d_u(n) = \begin{cases} e^{-j\frac{\pi u n(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, where $0\leq u<127$; or transmitting the S-PSS on a frequency resource different from a frequency resource occupied by an air-interface downlink-primary synchronization signal (DL-PSS), where the air-interface DL-PSS is transmitted by a base station to a terminal, and the S-PSS is transmitted by a terminal to another terminal.

Some embodiments of the present disclosure provide a computer readable storage medium having computer programs stored thereon, wherein when the computer programs are executed by a processor, the processor implements the steps of the method of transmitting the synchronization signal described above.

Beneficial effects of the present disclosure are as follows.

In the technical schemes provided in some embodiments of the present disclosure, a cycle shift is used, more specifically, CS is a positive integer not equal to 0, 43 and 86; or, a low correlation with the DL-PSS is maintained directly through a sequence; or, the S-PSS is transmitted on a frequency resource different from that occupied by the air-interface DL-PSS. Thus, this enables low correlation characteristic between the sidelink synchronization signal and an NR downlink synchronization signal to be maintained, thus, the problem of false alarms or false detections in the synchronization signal detection may be avoided, a success rate of sidelink synchronization signal detection may be improved, and time delay of sidelink synchronization establishment may be shorten.

BRIEF DESCRIPTION OF THE DRAWINGS

The drawings described herein are used to provide further understanding of the present disclosure and constitute a part of the present disclosure. The exemplary embodiments of the present disclosure and the description thereof are used to explain the present disclosure, and do not constitute an improper limitation on the present disclosure. In the drawings.

DETAILED DESCRIPTION

Before communications are performed for a purpose of exchanging control information and data information, both air-interface communications between a base station and a terminal and sidelink communications between terminals require synchronization between two communicating parties, to ensure that time references and frequency references of the two communicating parties are aligned, i.e., starting positions of symbols and sub-carriers are agreed upon.

A new m-sequence is employed for a Sidelink Primary Synchronization Signal (S-PSS) in the related art.

However, low correlation characteristic between the new m-sequence and a Downlink Primary Synchronization Signal (DL-PSS) cannot be effectively guaranteed. In a case that a cross-correlation coefficient indicating cross-correlation between the S-PSS and the DL-PSS is high, both for NR air-interface devices and NR V2X devices, both NR air-interface devices and NR V2X devices lack priori information at an initial access and do not know a source of a synchronization signal, so false alarms or false detections can occur, which leads to a lower probability of synchronization detection and an increase in synchronization delay.

Specific embodiments are illustrated below.

Figure 1:
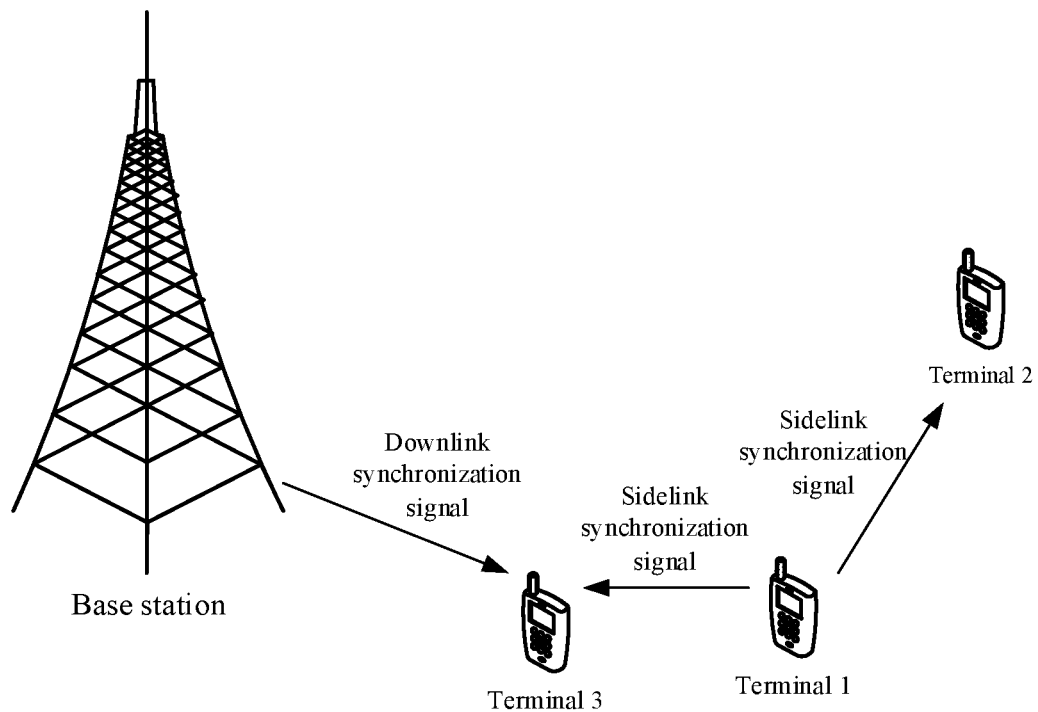
FIG. 1 is a schematic diagram illustrating a false detection of a sidelink synchronization signal and a downlink synchronization signal in some embodiments of the present disclosure.

FIG. 1 is a schematic diagram illustrating a false detection of a sidelink synchronization signal and a downlink synchronization signal. As shown in FIG. 1, when transmitting a sidelink synchronization signal, a terminal 1 uses a synchronization sequence having a high cross-correlation coefficient with a downlink synchronization signal, a terminal 3 within coverage of a base station mistakes the sidelink synchronization signal for the downlink synchronization signal and performs a synchronization signal detection, which leads to the reduction in the probability of synchronization detection for the terminal 3 and the increase in the synchronization delay.

Based on this, a scheme for transmitting a sidelink synchronization signal is proposed in some embodiments of the present disclosure. In the scheme, according to a scheme for generating a synchronization signal sequence given in some embodiments of the present disclosure, a transmitter may determine a sidelink synchronization signal sequence, and establish synchronization between two devices. The schemes provided in some embodiments of the present disclosure enable low correlation characteristic between the sidelink synchronization signal and the NR downlink synchronization signal to be maintained, thus, the problem of false alarms or false detections in the synchronization signal detection may be avoided, a success rate of sidelink synchronization signal detection may be improved, and a time delay of sidelink synchronization establishment may be shorten.

With the technical schemes provided in some embodiments of the present disclosure, compared with the related art, the transmitter can determine a sidelink synchronization signal sequence and establish synchronization between the two devices based on the scheme for generating the synchronization signal sequence given by the scheme. The method provided in the present disclosure enables low correlation characteristic between the sidelink synchronization signal and the NR downlink synchronization signal to be maintained, thus, the problem of false alarms or false detections in the synchronization signal detection may be avoided, a success rate of sidelink synchronization signal detection may be improved, and time delay of sidelink synchronization establishment may be shorten.

Figure 2:
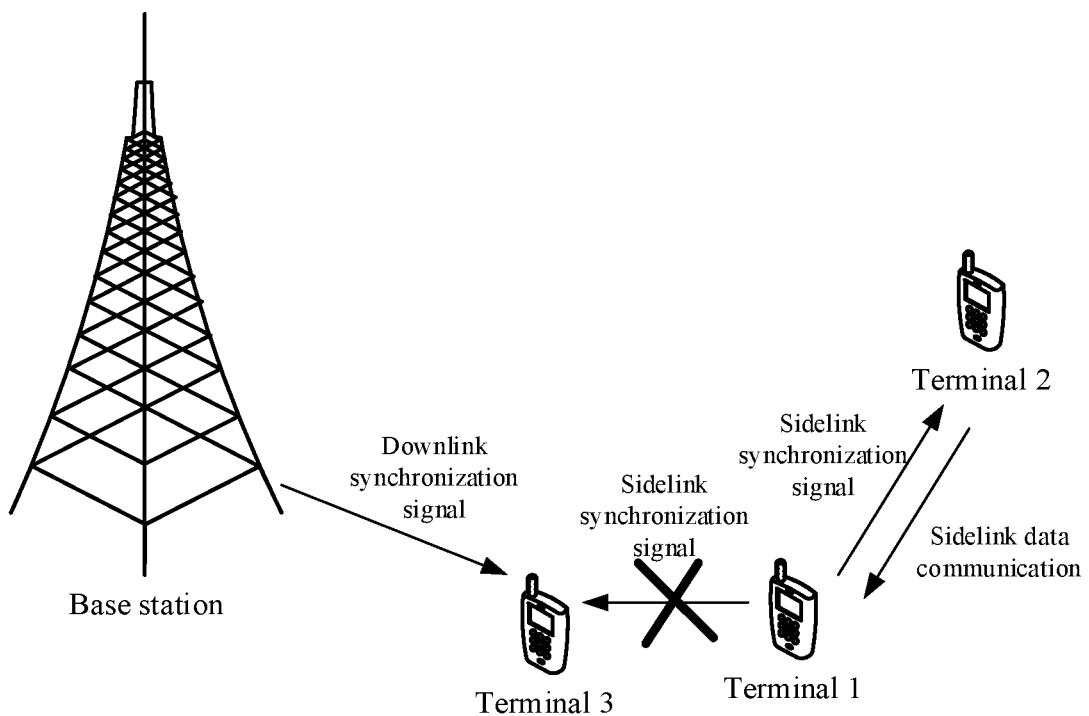
FIG. 2 is a schematic diagram illustrating a sidelink synchronization signal and a downlink synchronization signal after a low correlation synchronization signal is employed in some embodiments of the present disclosure.

FIG. 2 is a schematic diagram illustrating a sidelink synchronization signal and a downlink synchronization signal after a low correlation synchronization signal is employed. As shown in FIG. 2, a terminal 1 (transmitter) transmits a sidelink synchronization signal S-PSS to a terminal 2 (receiver), correlation between the sidelink synchronization signal S-PSS and the downlink synchronization signal DL-PSS is maintained to be low, the terminal 2 establishes synchronization with the terminal 1 based on the received sidelink synchronization signal S-PSS, and then the terminal 2 can perform sidelink data communication with the terminal 1. Due to the low correlation characteristic between the S-PSS and the DL-PSS, it does not lead to the problem of false alarms or false detections in the terminal 3.

Specific embodiments of the present disclosure are described below in combination with the accompanying drawings.

Figure 3:
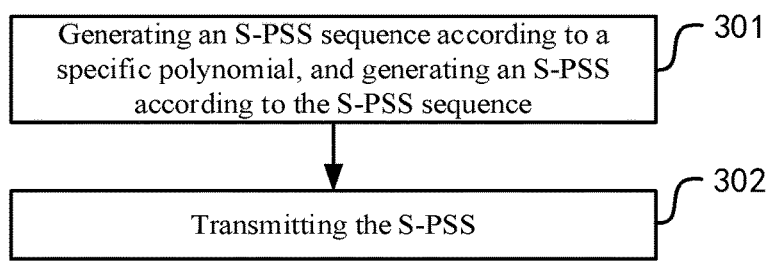
FIG. 3 is a schematic flowchart illustrating implementation of a method of transmitting a synchronization signal in some embodiments of the present disclosure.

FIG. 3 is a schematic flowchart illustrating implementation of a method of transmitting a synchronization signal. As shown in FIG. 3, Step 301 and Step 302 are included.

Step 301, generating an S-PSS sequence according to a specific polynomial, and generating an S-PSS synchronization signal according to the S-PSS sequence.

Step 302, transmitting the S-PSS.

Generating the S-PSS sequence according to the specific polynomial includes one or a combination of following manners:

1) generating an S-PSS sequence $d_{PSS}(n)$ according to a formula $d_{PSS}(n)=1-2x(m)$, where $x(m)$ is generated based on a polynomial $x(i+7)=(x(i+4)+x(i))\mod 2$, $m=(n+CS)\mod 127$, where $0 \leq n < 127$, n is a first sequence-numbering value, m is a second sequence-numbering value generated from n and CS, i is a third sequence-numbering value, CS is a cyclic shift value, and CS is a positive integer not equal to 0, 43 and 86; or, 2) generating an S-PSS sequence $d_{PSS}(n)$ according to a formula $d_{PSS}(n)=1-2x(m)$, where $x(m)$ is generated based on a polynomial $x(i+7)=(x(i+1)+x(i))\mod 2$, $m=(n+CS)\mod 127$, where $0 \leq n < 127$, n is a first sequence-numbering value, m is a second sequence-numbering value generated from n and CS, i is a third sequence-numbering value, CS is a cyclic shift value; or, 3) generating an S-PSS sequence $d_{PSS}(n)$ according to a formula $d_{PSS}(n)=d_u(n)$, where $$d_u(n) = \begin{cases} e^{-j\frac{\pi u n(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, where $0 \leq u < 127$; or 4) transmitting the S-PSS synchronization signal on a frequency resource different from a frequency resource occupied by an air-interface downlink-primary synchronization signal (DL-PSS), where the air-interface DL-PSS is transmitted by a base station to a terminal, and the S-PSS is transmitted between terminals.

Each of the above four manners is described below.

In a first manner, when generating the S-PSS sequence after cyclic shift processing is performed on the polynomial, the S-PSS sequence $d_{PSS}(n)$ is generated according to the formula $d_{PSS}(n)=1-2x(m)$, where $x(m)$ is generated based on the polynomial $x(i+7)=(x(i+4)+x(i))\mod 2$, $m=(n+CS)\mod 127$, where $0 \leq n < 127$, and CS is one or more positive integers not equal to 0, 43 and 86.

In this manner, even after the S-PSS and the NR DL-PSS are differentiated by using different cyclic shifts, a cross-correlation coefficient indicating cross-correlation between them varies with a frequency offset being increased, even affecting the success rate of synchronization detection. However, a generation-specific polynomial used to generate the S-PSS sequence is the same as that used for the NR DL-PSS sequence, and sequence-reusing between the S-PSS and the DL-PSS can reduce standardization workload and decrease implementation complexity of the terminal.

In a specific embodiment, when $x(m)$ is generated based on the polynomial $x(i+7)=(x(i+4)+x(i))\mod 2$, $m=(n+CS)\mod 127$, where $0 \leq n < 127$, a value of m is taken in one of following ways:

(1) $m=(n+43 \times N_{ID}^{(2)}+d1)\mod 127$, i.e., $CS=43 \times N_{ID}^{(2)}+d1$, where $N_{ID}^{(2)}$ is an index value of the S-PSS sequence, d1 is a positive integer; specifically, for example, d1=20.

Embodiment 1

The sequence $d_{PSS}(n)$ employed for the S-PSS is generated according to the formula $d_{PSS}(n)=1-2x(m)$, where $x(m)$ is generated based on the polynomial $x(i+7)=(x(i+4)+x(i))\mod 2$, and $m=(n+43 \times N_{ID}^{(2)}+d1)\mod 127$, i.e., $CS=43 \times N_{ID}^{(2)}+d1$, where $N_{ID}^{(2)}$ is an index value of the S-PSS sequence, d1 is a positive integer, for example, d1=20. Thus, if the S-PSS includes two synchronization sequences, then $N_{ID}^{(2)}=\{0,1\}$, and $CS=\{20,63\}$. CS are two positive integers not equal to 0, 43 and 86 in order to avoid high cross-correlation with the downlink synchronization signal.

(2) $m=(n+(43+d2)\times N_{ID}^{(2)}+d3)\mod 127$, i.e., $CS=(43+d2)\times N_{ID}^{(2)}+d3$, where $N_{ID}^{(2)}$ is an index value of the S-PSS sequence, both d2 and d3 are positive integers; specifically, for example, d2=20, d3=10.

Embodiment 2

The sequence $d_{PSS}(n)$ employed for the S-PSS is generated according to the formula $d_{PSS}(n)=1-2x(m)$, where $x(m)$ is generated based on the polynomial $x(i+7)=(x(i+4)+x(i))\mod 2$, and $m=(n+(43+d2)\times N_{ID}^{(2)}+d3)\mod 127$, i.e., $CS=(43+d2)\times N_{ID}^{(2)}+d3$, where $N_{ID}^{(2)}$ is an index value of the S-PSS sequence, both d2 and d3 are positive integers, for example, d2=20, d3=10. Thus, if the S-PSS includes two synchronization sequences, then $N_{ID}^{(2)}=\{0,1\}$, and CS=$\{10, 73\}$. CS are two positive integers not equal to 0, 43 and 86 in order to avoid high cross-correlation with the downlink synchronization signal.

(3) $m=(n+(43-d4)\times N_{ID}^{(2)}+d5) \bmod 127$, i.e., CS=$(43-d4)\times N_{ID}^{(2)}+d5$, where $N_{ID}^{(2)}$ is an index value of the S-PSS sequence, both d4 and d5 are positive integers; specifically, for example, d4=20, d5=10.

Embodiment 3

The sequence $d_{PSS}(n)$ employed for the S-PSS is generated according to the formula $d_{PSS}(n)=1-2x(m)$, where $x(m)$ is generated based on the polynomial $x(i+7)=(x(i+4)+x(i)) \bmod 2$, and $m=(n+(43-d4)\times N_{ID}^{(2)}+d5) \bmod 127$, i.e., CS=$(43-d4)\times N_{ID}^{(2)}+d5$, where $N_{ID}^{(2)}$ is an index value of the S-PSS sequence, both d4 and d5 are positive integers, for example, d4=20, d5=10. Thus if the S-PSS includes two synchronization sequences, $N_{ID}^{(2)}=\{0,1\}$, and CS=$\{10,23\}$. CS are two positive integers not equal to 0, 43 and 86 in order to avoid high cross-correlation with the downlink synchronization signal.

(4) $m=(n+43\times(N_{ID}^{(2)}+d6)) \bmod 127$, i.e., CS=$43\times(N_{ID}^{(2)}+d6)$, where $N_{ID}^{(2)}$ is an index value of the S-PSS sequence, d6 is a positive integer; specifically, for example, d6=3.

Embodiment 4

The sequence $d_{PSS}(n)$ employed for the S-PSS is generated according to the formula $d_{PSS}(n)=1-2x(m)$, where $x(m)$ is generated based on the polynomial $x(i+7)=(x(i+4)+x(i)) \bmod 2$, and $m=(n+43\times(N_{ID}^{(2)}+d6)) \bmod 127$, i.e., CS=$43\times(N_{ID}^{(2)}+d6)$, where $N_{ID}^{(2)}$ is an index value of the S-PSS sequence, d6 is a positive integer, for example, d6=3. Thus if the S-PSS includes two synchronization sequences, then $N_{ID}^{(2)}=\{0,1\}$, and CS=$\{129,172\}$. CS are two positive integers not equal to 0, 43 and 86 in order to avoid high cross-correlation with the downlink synchronization signal.

(5) $m=(n+43\times\{N1,N2\}) \bmod 127$, i.e., CS=$43\times\{N1,N2\}$, where N1 and N2 correspond to two index values $N_{ID}^{(2)}$ of the S-PSS sequence.

Embodiment 5

The sequence $d_{PSS}(n)$ employed for the S-PSS is generated according to the formula $d_{PSS}(n)=1-2x(m)$, where $x(m)$ is generated based on the polynomial $x(i+7)=(x(i+4)+x(i)) \bmod 2$, $m=(n+43\times\{N1,N2\}) \bmod 127$, i.e., CS=$43\times\{N1,N2\}$, where N1 and N2 correspond to two index values $N_{ID}^{(2)}$ of the S-PSS sequence, and N1 and N2 correspond to two cyclic shifts of an m-sequence employed for the S-PSS. Thus if N1=4, N2=7, then the S-PSS includes two synchronization sequences, CS=$\{172, 301\}$. CS are two positive integers not equal to 0, 43 and 86 in order to avoid high cross-correlation with the downlink synchronization signal.

(6) $m=(n+X1) \bmod 127$, i.e., CS=$\{X1\}$, where X1 corresponds to an index value $N_{ID}^{(2)}$ of the S-PSS sequence, and X1 corresponds to a cyclic shift of an m-sequence employed for the S-PSS.

Embodiment 6

The sequence $d_{PSS}(n)$ employed for the S-PSS is generated according to the formula $d_{PSS}(n)=1-2x(m)$, where $x(m)$ is generated based on the polynomial $x(i+7)=(x(i+4)+x(i)) \bmod 2$, $m=(n+X1) \bmod 127$, i.e., CS=$\{X1\}$, where X1 corresponds to an index value $N_{ID}^{(2)}$ of the S-PSS sequence, and X1 corresponds to a cyclic shift of an m-sequence employed for the S-PSS. Thus if X1=60, the S-PSS includes one synchronization sequence, then CS=$\{60\}$. CS are two positive integers not equal to 0, 43 and 86, in order to avoid high cross-correlation with the downlink synchronization signal.

(7) $m=(n+\{X2,X3\}) \bmod 127$, i.e., CS=$\{X2,X3\}$, where X2 and X3 correspond to two index values $N_{ID}^{(2)}$ of the S-PSS sequence, respectively, and X2 and X3 correspond to two cyclic shifts of an m-sequence employed for the S-PSS, respectively.

Embodiment 7

The sequence $d_{PSS}(n)$ employed for the S-PSS is generated according to the formula $d_{PSS}(n)=1-2x(m)$, where $x(m)$ is generated based on the polynomial $x(i+7)=(x(i+4)+x(i)) \bmod 2$, $m=(n+\{X2,X3\}) \bmod 127$, i.e., CS=$\{X2, X3\}$, where X2 and X3 correspond to two index values $N_{ID}^{(2)}$ of the S-PSS sequence, respectively. Thus if X2=20, X3=60, the S-PSS includes two synchronization sequences, then CS=$\{20, 60\}$. CS are two positive integers not equal to 0, 43 and 86, in order to avoid high cross-correlation with the downlink synchronization signal.

(8) $m=(n+\{X4,X5,X6\}) \bmod 127$, i.e., CS=$\{X4, X5, X6\}$, where X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively.

Embodiment 8

The sequence $d_{PSS}(n)$ employed for the S-PSS is generated according to the formula $d_{PSS}(n)=1-2x(m)$, where $x(m)$ is generated based on the polynomial $x(i+7)=(x(i+4)+x(i)) \bmod 2$, $m=(n+\{X4,X5,X6\}) \bmod 127$, i.e., CS=$\{X4, X5,X6\}$, where X4, X5 and X6 correspond to three index values $N_{ID}^{(2)}$ of the S-PSS sequence. Thus, if X4=20, X5=60, X6=100, the S-PSS includes three synchronization sequences, then CS=$\{20, 60, 100\}$. CS are two positive integers not equal to 0, 43 and 86 in order to avoid high cross-correlation with the downlink synchronization signal.

In a second manner, when generating the S-PSS sequence by using a polynomial different from the described one, the S-PSS sequence $d_{PSS}(n)$ is generated according to the formula $d_{PSS}(n)=1-2x(m)$, where $x(m)$ is generated based on the polynomial $x(i+7)=(x(i+1)+x(i)) \bmod 2$.

In this manner, the S-PSS cannot reuse the sequence of DL-PSS, which increases standardization effort and implementation complexity of the terminal. The generation-specific polynomial used to generate the S-PSS sequence is different from that used for the NR DL-PSS sequence and maintains a low correlation, so that a cross-correlation coefficient indicating cross-correlation therebetween is low even in case of a high frequency offset, which can improve the success rate of synchronization detection.

In a specific embodiment, when $x(m)$ is generated based on the polynomial $x(i+7)=(x(i+1)+x(i)) \bmod 2$, $m=(n+CS) \bmod 127$, where $0 \leq n < 127$, a value of m is taken in one of following ways (1)-(9):

(1) $m=(n+43\times N_{ID}^{(2)}+d1) \bmod 127$, i.e., CS=$43\times N_{ID}^{(2)}+d1$, where $N_{ID}^{(2)}$ is an index value of the S-PSS sequence, d1 is a positive integer; specifically, for example, d1=20.

Embodiment 9

The sequence $d_{PSS}(n)$ employed for the S-PSS is generated according to the formula $d_{PSS}(n)=1-2x(m)$, where $x(m)$ is generated based on the polynomial $x(i+7)=(x(i1)+x(i))$ mod 2, and $m=(n+43\times N_{ID}^{(2)}+d1)$mod 127, i.e., $CS=43\times N_{ID}^{(2)}+d1$, where $N_{ID}^{(2)}$ is an index value of the S-PSS sequence, d1 is a positive integer, for example, d1=20. Thus if the S-PSS includes two synchronization sequences, then $N_{ID}^{(2)}=\{0,1\}$, and $CS=\{20,63\}$.

(2) $m=(n+(43+d2)\times N_{ID}^{(2)}+d3)$mod 127, i.e., $CS=(43+d2)\times N_{ID}^{(2)}+d3$, where $N_{ID}^{(2)}$ is an index value of the S-PSS sequence, both d2 and d3 are positive integers; specifically, for example, d2=20, d3=10.

Embodiment 10

The sequence $d_{PSS}(n)$ employed for the S-PSS is generated according to the formula $d_{PSS}(n)=1-2x(m)$, where x(m) is generated based on the polynomial $x(i+7)=(x(i1)+x(i))$ mod 2, and $m=(n+(43+d2)\times N_{ID}^{(2)}+d3)$mod 127, i.e., $CS=(43+d2)\times N_{ID}^{(2)}+d3$, where $N_{ID}^{(2)}$ is an index value of the S-PSS sequence, both d2 and d3 are positive integers, for example, d2=20, d3=10. Thus if the S-PSS includes two synchronization sequences, then $N_{ID}^{(2)}=\{0,1\}$, and $CS=\{10, 73\}$.

(3) $m=(n+(43-d4)\times N_{ID}^{(2)}+d5)$mod 127, i.e., $CS=(43-d4)\times N_{ID}^{(2)}+d5$, where $N_{ID}^{(2)}$ is an index value of the S-PSS sequence, both d4 and d5 are positive integers; specifically, for example, d4=20, d5=10.

Embodiment 11

The sequence $d_{PSS}(n)$ employed for the S-PSS is generated according to the formula $d_{PSS}(n)=1-2x(m)$, where x(m) is generated based on the polynomial $x(i+7)=(x(i+1)+x(i))$ mod 2, and $m=(n+(43-d4)\times N_{ID}^{(2)}+d5)$mod 127, i.e., $CS=(43-d4)\times N_{ID}^{(2)}+d5$, where $N_{ID}^{(2)}$ is an index value of the S-PSS sequence, both d4 and d5 are positive integers, for example, d4=20, d5=10. Thus if the S-PSS includes two synchronization sequences, then $N_{ID}^{(2)}=\{0,1\}$, and $CS=\{10, 23\}$.

(4) $m=(n+43\times(N_{ID}^{(2)}+d6))$mod 127, i.e., $CS=43\times(N_{ID}^{(2)}+d6)$, where $N_{ID}^{(2)}$ is an index value of the S-PSS sequence, d6 is a positive integer; specifically, for example, d6=3.

Embodiment 12

The sequence $d_{PSS}(n)$ employed for the S-PSS is generated according to the formula $d_{PSS}(n)=1-2x(m)$, where x(m) is generated based on the polynomial $x(i+7)=(x(i+1)+x(i))$mod 2, and $m=(n+43\times(N_{ID}^{(2)}+d6))$mod 127, i.e., $CS=43\times(N_{ID}^{(2)}+d6)$, where $N_{ID}^{(2)}$ is an index value of the S-PSS sequence, d6 is a positive integer, for example, d6=3. Thus if the S-PSS includes two synchronization sequences, then $N_{ID}^{(2)}=\{0,1\}$, and $CS=\{129,172\}$. CS are two positive integers not equal to 0, 43 and 86, in order to avoid high cross-correlation with the downlink synchronization signal.

(5) $m=(n+43\times\{N1,N2\})$mod 127, i.e., $CS=43\times\{N1,N2\}$, where N1 and N2 correspond to two index values $N_{ID}^{(2)}$ of the S-PSS sequence.

Embodiment 13

The sequence $d_{PSS}(n)$ employed for the S-PSS is generated according to the formula $d_{PSS}(n)=1-2x(m)$, where x(m) is generated based on the polynomial $x(i+7)=(x(i+1)+x(i))$ mod 2, and $m=(n+43\times\{N1,N2\})$mod 127, i.e., $CS=43\times\{N1, N2\}$, where N1 and N2 correspond to two index values $N_{ID}^{(2)}$ of the S-PSS sequence, and N1 and N2 correspond to two cyclic shifts of an m-sequence employed for the S-PSS.

Thus if N1=4, N2=7, then the S-PSS includes two synchronization sequences, $CS=\{172, 301\}$. CS are two positive integers not equal to 0, 43 and 86, in order to avoid high cross-correlation with the downlink synchronization signal.

(6) $m=(n+X1)$mod 127, i.e., $CS=\{X1\}$, X1 corresponds to an index value $N_{ID}^{(2)}$ of the S-PSS sequence, and X1 corresponds to a cyclic shift of an m-sequence employed for the S-PSS.

Embodiment 14

The sequence $d_{PSS}(n)$ employed for the S-PSS is generated according to the formula $d_{PSS}(n)=1-2x(m)$, where x(m) is generated based on the polynomial $x(i+7)=(x(i+1)+x(i))$ mod 2, $m=(n+X1)$mod 127, i.e., $CS=\{X1\}$, where X1 corresponds to an index value $N_{ID}^{(2)}$ of the S-PSS sequence, and X1 corresponds to a cyclic shift of an m-sequence employed for the S-PSS. Thus if X1=60, the S-PSS includes one synchronization sequence, then $CS=\{60\}$.

(7) $m=(n+\{X2,X3\})$mod 127, i.e., $CS=\{X2,X3\}$, where X2 and X3 correspond to two index values $N_{ID}^{(2)}$ of the S-PSS sequence, respectively, and X2 and X3 correspond to two cyclic shifts of an m-sequence employed for the S-PSS, respectively.

Embodiment 15

The sequence $d_{PSS}(n)$ employed for the S-PSS is generated according to the formula $d_{PSS}(n)=1-2x(m)$, where x(m) is generated based on the polynomial $x(i+7)=(x(i+1)+x(i))$ mod 2, $m=(n+\{X2,X3\})$mod 127, i.e., $CS=\{X2,X3\}$, X2 and X3 correspond to two index values $N_{ID}^{(2)}$ of the S-PSS sequence, respectively. Thus if X2=20, X3=60, the S-PSS includes two synchronization sequences, then $CS=\{20, 60\}$.

(8) $m=(n+\{X4,X5,X6\})$mod 127, i.e., $CS=\{X4,X5,X6\}$, X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively.

Embodiment 16

The sequence $d_{PSS}(n)$ employed for the S-PSS is generated according to the formula $d_{PSS}(n)=1-2x(m)$, where x(m) is generated based on the polynomial $x(i+7)=(x(i+1)+x(i))$ mod 2, $m=(n+\{X4,X5,X6\})$mod 127, i.e., $CS=\{X4,X5,X6\}$, where X4, X5 and X6 correspond to three index values $N_{ID}^{(2)}$ of the S-PSS sequence. Thus if X4=20, X5=60, X6=100, the S-PSS includes three synchronization sequences, then $CS=\{20, 60, 100\}$.

(9) $m=(n+d6\times N_{ID}^{(2)})$mod 127, i.e., $CS=d6\times N_{ID}^{(2)}$, where $N_{ID}^{(2)}$ is an index value of the S-PSS sequence, d6 is a positive integer; specifically, for example, d6=43.

Embodiment 17

The sequence $d_{PSS}(n)$ employed for the S-PSS is generated according to the formula $d_{PSS}(n)=1-2x(m)$, where x(m) is generated based on the polynomial $x(i+7)=(x(i+1)+x(i))$ mod 2, $m=(n+d6\times N_{ID}^{(2)})$mod 127, i.e., $CS=d6\times N_{ID}^{(2)}$, where $N_{ID}^{(2)}$ is an index value of the S-PSS sequence, d6 is a positive integer; specifically, for example, d6=43. Thus if the S-PSS includes two synchronization sequences, then $N_{ID}^{(2)}=\{0,1\}$, $CS=\{0,43\}$.

In a third manner, after a ZC sequence is generated based on the polynomial, the S-PSS sequence $d_{PSS}(n)$ is generated according to the formula $d_{PSS}(n)=d_u(n)$ when the ZC sequence is used as the S-PSS sequence, where, $$d_u(n) = \begin{cases} e^{-j\frac{\pi un(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, where 0≤u<127.

In this manner, the sequence generated by using the formula is a Zadoff-Chu (ZC) sequence. Considering that the ZC sequence is slightly less resistant to the Doppler shift than the m-sequence, this may affect the success rate of synchronization detection, but the generation formula used in this scheme for generating the S-PSS sequence is the same as that used for a Long Term Evolution (LTE) DL-PSS sequence, and sequence-reusing between the S-PSS and the LTE DL-PSS can reduce the standardization effort and reduce the implementation complexity of the terminal.

Embodiment 18

The sequence $d_{PSS}(n)$ employed for the S-PSS is generated according to the formula $d_{PSS}(n)=d_u(n)$, where $$d_u(n) = \begin{cases} e^{-j\frac{\pi un(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, where 0≤u<127.

u in the above formula may be set to U1,U2. U1 and U2 correspond to two index values $N_{ID}^{(2)}$ of the S-PSS sequence, respectively. Thus if U1=52, U2=74, the S-PSS includes two synchronization sequences, then the root sequence index, u={52, 74}.

In a fourth manner, the S-PSS is transmitted on a frequency resource different from a frequency resource occupied by an air-interface DL-PSS.

In this manner, even considering that this scheme can only be used in scenarios for dedicated carriers, i.e., scenarios where different carriers are used for the sidelink and the air-interface link, the application scenario is limited. However, this S-PSS configuration scheme can maintain the low correlation between the S-PSS and the air-interface downlink synchronization signal through different frequency-domain resources without the need for complex sequence designs, thereby reducing the standardization effort and the implementation complexity of the terminal.

In a specific embodiment, the frequency resource may include one or a combination of following resources: a subcarrier, a resource block, a Bandwidth Part (BWP), a carrier, a frequency band.

Embodiment 19

The frequency resources used by the S-PSS are different from those used by the air-interface synchronization signal, and the different frequency resources described here include different subcarriers, different resource blocks, different BWPs, different carriers or different frequency bands. That is, different frequency-domain resources are used to distinguish the sidelink synchronization signal from the air-interface downlink synchronization signal, which in turn maintains the low correlation between the sidelink synchronization signal and the air-interface downlink synchronization signal.

Based on the same inventive concept, an apparatus for transmitting a synchronization signal, a terminal, and a computer readable storage medium are also provided in some embodiments of the present disclosure. Since these devices solve the problem by using similar principles and methods, the implementations of these devices can be referred to the implementations of the method, and the repetition among the implementations will not be repeated.

The technical schemes provided in some embodiments of the present disclosure can be implemented in the following manners.

Figure 4:
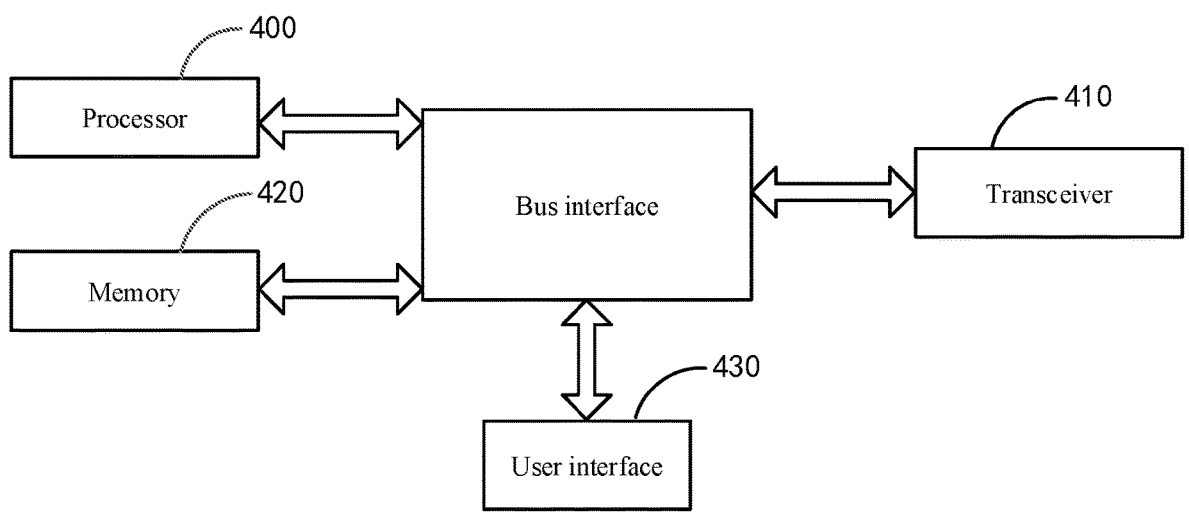
FIG. 4 is a schematic diagram illustrating a structure of a terminal in some embodiments of the present disclosure.

FIG. 4 is a schematic diagram illustrating a structure of a terminal. As shown in FIG. 4, the terminal includes:

a processor 400, configured to read programs in a memory 420 and perform following process: generating an S-PSS sequence according to a specific polynomial, and generating an S-PSS synchronization signal according to the S-PSS sequence;

a transceiver 410, configured to receive and transmit data under control of the processor 400 and perform following process:

transmitting the S-PSS synchronization signal;

where, generating the S-PSS sequence according to the specific polynomial includes one or a combination of:

generating an S-PSS sequence $d_{PSS}(n)$ according to a formula $d_{PSS}(n)=1-2x(m)$, where x(m) is generated based on a polynomial $x(i+7)=(x(i+4)+x(i)) \bmod 2$, $m=(n+CS) \bmod 127$ where 0≤n<127, n is a first sequence-numbering value, m is a second sequence-numbering value generated from n and CS, i is a third sequence-numbering value, CS is cyclic shift, and CS is a positive integer not equal to 0, 43 and 86; or, generating an S-PSS sequence $d_{PSS}(n)$ according to a formula $d_{PSS}(n)=1-2x(m)$, where x(m) is generated based on a polynomial $x(i+7)=(x(i+1)+x(i)) \bmod 2$, $m=(n+CS) \bmod 127$ where 0≤n<127, n is a first sequence-numbering value, m is a second sequence-numbering value generated from n and CS, i is a third sequence-numbering value, CS is cyclic shift; or, generating an S-PSS sequence $d_{PSS}(n)$ according to a formula $d_{PSS}(n)=d_u(n)$, where $$d_u(n) = \begin{cases} e^{-j\frac{\pi un(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, where 0≤u<127; or transmitting the S-PSS synchronization signal on a frequency resource different from a frequency resource occupied by an air-interface downlink-primary synchronization signal (DL-PSS), where the air-interface DL-PSS is transmitted by a base station to a terminal, and the S-PSS is transmitted between terminals.

In an embodiment, when x(m) is generated based on the polynomial $x(i+7)=(x(i+4)+x(i)) \bmod 2$, a value of m is taken in one of following ways:

$m=(n+43 \times N_{ID}^{(2)}+d1) \bmod 127$, i.e., $CS=43 \times N_{ID}^{(2)}+d1$, where $N_{ID}^{(2)}$ is an index value of the S-PSS sequence, d1 is a positive integer; or, $m=(n+(43+d2) \times N_{ID}^{(2)}+d3) \bmod 127$, i.e., $CS=(43+d2) \times N_{ID}^{(2)}+d3$, where $N_{ID}^{(2)}$ is an index value of the S-PSS sequence, both d2 and d3 are positive integers; or, $m=(n+(43-d4) \times N_{ID}^{(2)}+d5) \bmod 127$, i.e., $CS=(43-d4) \times N_{ID}^{(2)}+d5$, where $N_{ID}^{(2)}$ is an index value of the S-PSS sequence, both d4 and d5 are positive integers; or, m=(n+43×($N_{ID}^{(2)}$+d6))mod 127, i.e., CS=43×($N_{ID}^{(2)}$+d6), where $N_{ID}^{(2)}$ is an index value of the S-PSS sequence, d6 is a positive integer; or, m=(n+43×{N1,N2})mod 127, i.e., CS=43×{N1,N2}, where N1 and N2 correspond to two index values $N_{ID}^{(2)}$ of the S-PSS sequence, and N1 and N2 correspond to two cyclic shifts of an m-sequence employed for the S-PSS; or, m=(n+X1)mod 127, i.e., CS={X1}, where X1 corresponds to an index value $N_{ID}^{(2)}$ of the S-PSS sequence, and X1 corresponds to a cyclic shift of an m-sequence employed for the S-PSS; or, m=(n+{X2,X3})mod 127, i.e., CS={X2,X3}, where X2 and X3 correspond to two index values $N_{ID}^{(2)}$ of the S-PSS sequence, respectively, and X2 and X3 correspond to two cyclic shifts of an m-sequence employed for the S-PSS, respectively; or, m=(n+{X4,X5,X6})mod 127, i.e., CS={X4,X5,X6}, where X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively.

In an embodiment, when x(m) is generated based on the polynomial x(i+7)=(x(i+1)+x(i))mod 2, a value of m is taken in one of following ways:

m=(n+43×$N_{ID}^{(2)}$+d1)mod 127, i.e., CS=43×$N_{ID}^{(2)}$+d1, where $N_{ID}^{(2)}$ is an index value of the S-PSS sequence, d1 is a positive integer; or, m=(n+(43+d2)×$N_{ID}^{(2)}$+d3)mod 127, i.e., CS=(43+d2)× $N_{ID}^{(2)}$+d3, where $N_{ID}^{(2)}$ is an index value of the S-PSS sequence, both d2 and d3 are positive integers; or, m=(n+(43−d4)×$N_{ID}^{(2)}$+d5)mod 127, i.e., CS=(43−d4)× $N_{ID}^{(2)}$+d5, where $N_{ID}^{(2)}$ is an index value of the S-PSS sequence, both d4 and d5 are positive integers; or, m=(n+43×($N_{ID}^{(2)}$+d6))mod 127, i.e., CS=43×($N_{ID}^{(2)}$+d6), where $N_{ID}^{(2)}$ is an index value of the S-PSS sequence, d6 is a positive integer; or, m=(n+43×{N1,N2})mod 127, i.e., CS=43×{N1,N2}, where N1 and N2 correspond to two index values $N_{ID}^{(2)}$ of the S-PSS sequence, and N1 and N2 correspond to two cyclic shifts of an m-sequence employed for the S-PSS; or, m=(n+X1)mod 127, i.e., CS={X1}, where X1 corresponds to an index value $N_{ID}^{(2)}$ of the S-PSS sequence, and X1 corresponds to a cyclic shift of an m-sequence employed for the S-PSS; or, m=(n+{X2,X3})mod 127, i.e., CS={X2,X3}, where X2 and X3 correspond to two index values $N_{ID}^{(2)}$ of the S-PSS sequence, respectively, and X2 and X3 correspond to two cyclic shifts of an m-sequence employed for the S-PSS, respectively; or, m=(n+{X4,X5,X6})mod 127, i.e., CS={X4,X5,X6}, where X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively; or, m=(n+d6×$N_{ID}^{(2)}$)mod 127, i.e., CS=d6×$N_{ID}^{(2)}$, where $N_{ID}^{(2)}$ is an index value of the S-PSS sequence, d6 is a positive integer.

In an embodiment, the frequency resource includes one or a combination of: a subcarrier, a resource block, a BWP, a carrier, a frequency band.

In FIG. 4, a bus architecture may include any number of interconnected buses and bridges. Various circuits, specifically, one or more processors represented by the processor 400 and a memory represented by the memory 420, are linked together. The bus architecture may also link various other circuits such as peripherals, voltage regulators and power management circuits, which are well known in the art, and therefore a further description is omitted herein. The bus interface provides interfaces. The transceiver 410 may be a plurality of elements, i.e., includes a transmitter and a receiver, to provide units configured to communicate with various other devices over a transmission medium. For different user devices, the user interface 430 can also be an interface capable of externally/internally connecting required devices which include, but are not limited to, a keypad, a display, a speaker, a microphone, a joystick, and the like.

The processor 400 is responsible for managing the bus architecture and general processing, and the memory 420 may store data used by the processor 400 when performing operations.

Some embodiments of the present disclosure provide an apparatus for transmitting a synchronization signal. The apparatus includes: a synchronization signal generation module, configured to generate a sidelink-primary synchronization signal (S-PSS) sequence according to a specific polynomial, and generate an S-PSS synchronization signal according to the S-PSS sequence; a transmission module, configured to transmit the S-PSS synchronization signal; where, generating the S-PSS sequence according to the specific polynomial includes one or a combination of:

generating an S-PSS sequence $d_{PSS}(n)$ according to a formula $d_{PSS}(n)=1-2x(m)$, where x(m) is generated based on a polynomial x(i+7)=(x(i+4)+x(i))mod 2, m=(n+CS)mod 127 where 0≤n<127, n is a first sequence-numbering value, m is a second sequence-numbering value generated from n and CS, i is a third sequence-numbering value, CS is cyclic shift, and CS is a positive integer not equal to 0, 43 and 86; or, generating an S-PSS sequence $d_{PSS}(n)$ according to a formula $d_{PSS}(n)=1-2x(m)$, where x(m) is generated based on a polynomial x(i+7)=(x(i+1)+x(i))mod 2, m=(n+CS)mod 127 where 0≤n<127, n is a first sequence-numbering value, m is a second sequence-numbering value generated from n and CS, i is a third sequence-numbering value, CS is a cyclic shift; or, generating an S-PSS sequence $d_{PSS}(n)$ according to a formula $d_{PSS}(n)=d_u(n)$, where $$d_u(n) = \begin{cases} e^{-j\frac{\pi u n(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, where 0≤u<127; or transmitting the S-PSS synchronization signal on a frequency resource different from a frequency resource occupied by an air-interface downlink-primary synchronization signal (DL-PSS), where the air-interface DL-PSS is transmitted by a base station to a terminal, and the S-PSS is transmitted between terminals.

Some embodiments of the present disclosure further provide a computer readable storage medium having computer programs stored thereon, when the computer programs are executed by a processor, the processor implements the steps of the method of transmitting the synchronization signal described above.

Specifically, the processor executes computer programs that performs the following methods: generating an S-PSS sequence according to a specific polynomial, and generating an S-PSS synchronization signal according to the S-PSS sequence, and transmitting the S-PSS; where generating the S-PSS sequence according to the specific polynomial includes one or a combination of:

generating an S-PSS sequence $d_{PSS}(n)$ according to a formula $d_{PSS}(n)=1-2x(m)$, where x(m) is generated based on a polynomial $x(i+7)=(x(i+4)+x(i))\bmod 2$, $m=(n+CS)\bmod 127$ where $0\leq n<127$, n is a first sequence-numbering value, m is a second sequence-numbering value generated from n and CS, i is a third sequence-numbering value, CS is cyclic shift, and CS is a positive integer not equal to 0, 43 and 86; or, generating an S-PSS sequence $d_{PSS}(n)$ according to a formula $d_{PSS}(n)=1-2x(m)$, where x(m) is generated based on a polynomial $x(i+7)=(x(i+1)+x(i))\bmod 2$, $m=(n+CS)\bmod 127$ where $0\leq n<127$, n is a first sequence-numbering value, m is a second sequence-numbering value generated from n and CS, i is a third sequence-numbering value, CS is cyclic shift; or, generating an S-PSS sequence $d_{PSS}(n)$ according to a formula $d_{PSS}(n)=d_u(n)$, where $$d_u(n) = \begin{cases} e^{-j\frac{\pi u n(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, where $0\leq u<127$; or transmitting the S-PSS synchronization signal on a frequency resource different from a frequency resource occupied by an air-interface downlink-primary synchronization signal (DL-PSS), where the air-interface DL-PSS is transmitted by a base station to a terminal, and the S-PSS is transmitted between terminals.

In an embodiment, when x(m) is generated based on the polynomial $x(i+7)=(x(i+4)+x(i))\bmod 2$, a value of m is taken in one of following ways:

$m=(n+43\times N_{ID}^{(2)}+d1)\bmod 127$, i.e., $CS=43\times N_{ID}^{(2)}+d1$, where $N_{ID}^{(2)}$ is an index value of the S-PSS sequence, d1 is a positive integer; or, $m=(n+(43+d2)\times N_{ID}^{(2)}+d3)\bmod 127$, i.e., $CS=(43+d2)\times N_{ID}^{(2)}+d3$, where $N_{ID}^{(2)}$ is an index value of the S-PSS sequence, both d2 and d3 are positive integers; or, $m=(n+(43-d4)\times N_{ID}^{(2)}+d5)\bmod 127$, i.e., $CS=(43-d4)\times N_{ID}^{(2)}+d5$, where $N_{ID}^{(2)}$ is an index value of the S-PSS sequence, both d4 and d5 are positive integers; or, $m=(n+43\times(N_{ID}^{(2)}+d6))\bmod 127$, i.e., $CS=43\times(N_{ID}^{(2)}+d6)$, where $N_{ID}^{(2)}$ is an index value of the S-PSS sequence, d6 is a positive integer; or, $m=(n+43\times\{N1,N2\})\bmod 127$, i.e., $CS=43\times\{N1,N2\}$, where N1 and N2 correspond to two index values $N_{ID}^{(2)}$ of the S-PSS sequence, and N1 and N2 correspond to two cyclic shifts of an m-sequence employed for the S-PSS; or, $m=(n+X1)\bmod 127$, i.e., $CS=\{X1\}$, where X1 corresponds to an index value $N_{ID}^{(2)}$ of the S-PSS sequence, and X1 corresponds to a cyclic shift of an m-sequence employed for the S-PSS; or, $m=(n+\{X2,X3\})\bmod 127$, i.e., $CS=\{X2,X3\}$, where X2 and X3 correspond to two index values $N_{ID}^{(2)}$ of the S-PSS sequence, respectively, and X2 and X3 correspond to two cyclic shifts of an m-sequence employed for the S-PSS, respectively; or, $m=(n+\{X4,X5,X6\})\bmod 127$, i.e., $CS=\{X4,X5,X6\}$, where X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively; or, $m=(n+d6\times N_{ID}^{(2)})\bmod 127$, i.e., $CS=d6\times N_{ID}^{(2)}$, where $N_{ID}^{(2)}$ is an index value of the S-PSS sequence, d6 is a positive integer.

In an embodiment, the frequency resource includes one or a combination of following resources: a subcarrier, a resource block, a BWP, a carrier, a frequency band.

The specific implementation can be referred to the implementation of the method of transmitting the synchronization signal described above.

For the convenience of description, a function of each part of the above described device is described separately by various modules or units. Of course, functions of each module or unit can be implemented in the same or multiple software or hardware when implementing the present disclosure.

In summary, in technical schemes provided in some embodiments of the present disclosure, a first device transmits a synchronization signal to a second device.

A sequence $d_{PSS}(n)$ employed for the synchronization signal is generated according to a formula $d_{PSS}(n)=1-2x(m)$, where x(m) is generated based on a polynomial $x(i+7)=(x(i+4)+x(i))\bmod 2$ or based on a polynomial $x(i+7)=(x(i+1)+x(i))\bmod 2$, where $m=(n+CS)\bmod 127$ where $0\leq n<127$. When the polynomial $x(i+7)=(x(i+4)+x(i))\bmod 2$ is used to generate the sequence, CS is one or more positive integers not equal to 0, 43 and 86.

Optionally, the sequence employed for the synchronization signal is generated according to a formula $d_{PSS}(n)=d(n)$, where $$d_u(n) = \begin{cases} e^{-j\frac{\pi u n(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, where $0\leq u<127$.

Optionally, a frequency resources used by the synchronization signal is different from that used by an air-interface synchronization signal.

Then the first device and the second device may establish synchronization according to the synchronization signal.

This scheme can be used in sidelink communication for V2X systems.

In the scheme, according to a scheme for generating a synchronization signal sequence given in some embodiments of the present disclosure, a transmitter may determine a sidelink synchronization signal sequence, and establish synchronization between the two devices. The schemes provided in some embodiments of the present disclosure enables low correlation characteristic between the sidelink synchronization signal and the NR downlink synchronization signal to be maintained, thus, the problem of false alarms or false detections in the synchronization signal detection may be avoided, a success rate of sidelink synchronization signal detection may be improved, and time delay of sidelink synchronization establishment may be shorten.

Those skilled in the art will appreciate that embodiments of the present disclosure may be provided as a method, a system or a computer program product. Accordingly, the present disclosure may take the form of an entirely hardware embodiment, an entirely software embodiment or an embodiment combining software and hardware aspects. Moreover, the present disclosure may use the form of a computer program product implemented by one or more computer usable storage medium (including but not limit to disk memory and optical memory etc.) including programming codes that may be executed by computers.

The present disclosure is described with reference to flowcharts and/or block diagrams of methods, devices (systems) and computer program products according to some embodiments of the present disclosure. It will be understood that each flow and/or block of flowcharts and/or block diagrams and a combination of flows and/or blocks in the flowcharts and/or block diagrams may be implemented by computer program instructions. These computer program instructions may be provided to a processor of a general purpose computer, a special purpose computer, an embedded processor or other programmable data processing device to produce a machine, so that the instructions executed by a processor of a computer or other programmable data processing device are caused to produce a device for implementing the functions designated in one or more flows of the flowcharts or in one or more blocks of the block diagrams.

The computer program instructions may also be stored in a computer readable memory that may direct a computer or other programmable data processing device to operate in a particular manner, such that instructions stored in the computer readable memory produce an article of manufacture including the instruction device, and the instruction device implements the functions designated in one or more flows of the flowcharts or in one or more blocks of the block diagrams.

These computer program instructions may also be loaded onto a computer or other programmable data processing device such that a series of operational steps are performed on the computer or other programmable device to produce computer-implemented processing, such that the instructions executed on a computer or other programmable device provide steps for implementing the functions designated in one or more flows of the flowcharts or in one or more blocks of the block diagrams.

It is to be understood that the embodiments described in some embodiments of the present disclosure may be implemented in hardware, software, firmware, middleware, microcode, or any combination thereof. For hardware implementation, modules, units, submodules or subunits, etc. may be implemented in one or more Application Specific Integrated Circuits (ASIC), Digital Signal Processors (DSP), DSP Devices (DSPD), Programmable Logic Devices (PLD), Field-Programmable Gate Array (FPGA), general purpose processors, controllers, microcontrollers, microprocessors, other electronic units configured to perform the function described in the present disclosure, or a combination thereof.

For software implementation, the techniques described in some embodiments of the present disclosure may be implemented by modules (e.g., processes, functions, etc.) that perform the functions described in some embodiments of the present disclosure. The software codes can be stored in the memory and executed by the processor. The memory can be implemented within the processor or external to the processor.

Therefore, the objects of the present disclosure may also be achieved by running a program or a set of programs on any computing device. The computing device may be a well-known general purpose device. Accordingly, the objects of the present disclosure may also be realized by merely providing a program product including program codes for implementing the method or the device. That is to say, such a program product also constitutes the present disclosure, and a storage medium storing such a program product also constitutes the present disclosure. It will be apparent that the storage medium may be any known storage medium or any storage medium developed in the future. It should also be noted that in the device and the method of the present disclosure, it is apparent that various components or steps may be decomposed and/or recombined. The decomposition and/or recombination should be considered as equivalents of the present disclosure. Also, the steps of performing the series of processes described above may naturally be performed in the chronological order in the order illustrated, but not necessarily be required to be performed in the chronological order. Certain steps may be performed in parallel or independently of one another.

Obviously, those skilled in the art may make various changes and modifications to the present disclosure without departing from spirit and scope of the present disclosure. In this way, if these modifications and variations of the present disclosure fall within scope of the claims of the present disclosure and their equivalent technologies, the present disclosure is also intended to include these modifications and variations.

What is claimed is:

1. A method of transmitting a synchronization signal, comprising:

generating a sidelink-primary synchronization signal (S-PSS) sequence according to a specific polynomial, and generating an S-PSS synchronization signal according to the S-PSS sequence;

transmitting the S-PSS synchronization signal; wherein, generating the S-PSS sequence according to the specific polynomial comprises one or a combination of following:

generating an S-PSS sequence $d_{PSS}(n)$ according to a formula $d_{PSS}(n)=1-2x(m)$, wherein $x(m)$ is generated based on a polynomial $x(i+7)=(x(i+4)+x(i)) \bmod 2$, $m=(n+CS) \bmod 127$, wherein $0 \leq n < 127$, n is a first sequence-numbering value, m is a second sequence-numbering value generated from n and CS, i is a third sequence-numbering value, CS is cyclic shift, and CS is a positive integer not equal to 0, 43 and 86; or, generating an S-PSS sequence $d_{PSS}(n)$ according to a formula $d_{PSS}(n)=1-2x(m)$, wherein $x(m)$ is generated based on a polynomial $x(i+7)=(x(i+1)+x(i))\bmod 2$, $m=(n+CS)\bmod 127$, wherein $0\leq n<127$, n is a first sequence-numbering value, m is a second sequence-numbering value generated from n and CS, i is a third sequence-numbering value, CS is cyclic shift; or, generating an S-PSS sequence $d_{PSS}(n)$ according to a formula $d_{PSS}(n)=d_u(n)$, wherein $$d_u(n) = \begin{cases} e^{-j\frac{\pi u n(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, wherein $0\leq u<127$; or transmitting the S-PSS synchronization signal on a frequency resource different from a frequency resource occupied by an air-interface downlink-primary synchronization signal (DL-PSS), wherein the air-interface DL-PSS is transmitted by a base station to a terminal, and the S-PSS is transmitted by a terminal to another terminal, wherein when $x(m)$ is generated based on the polynomial $x(i+7)=(x(i+4)+x(i))\bmod 2$, a value of m is taken in one of following ways:

$m=(n+43\times N_{ID}^{(2)}+d1)\bmod 127$, $CS=43\times N_{ID}^{(2)}+d1$, wherein $N_{ID}^{(2)}$ is an index value of the S-PSS sequence, d1 is a positive integer; or, $m=(n+(43+d2)\times N_{ID}^{(2)}+d3)\bmod 127$, $CS=(43+d2)\times N_{ID}^{(2)}+d3$, wherein $N_{ID}^{(2)}$ is an index value of the S-PSS sequence, both d2 and d3 are positive integers; or, $m=(n+(43-d4)\times N_{ID}^{(2)}+d5)\bmod 127$, $CS=(43-d4)\times N_{ID}^{(2)}+d5$, wherein $N_{ID}^{(2)}$ is an index value of the S-PSS sequence, both d4 and d5 are positive integers; or, $m=(n+43\times(N_{ID}^{(2)}+d6))\bmod 127$, $CS=43\times(N_{ID}^{(2)}+d6)$, wherein $N_{ID}^{(2)}$ is an index value of the S-PSS sequence, d6 is a positive integer; or, $m=(n+43\times\{N1,N2\})\bmod 127$, $CS=43\times\{N1,N2\}$, wherein N1 and N2 correspond to two index values $N_{ID}^{(2)}$ of the S-PSS sequence, and N1 and N2 correspond to two cyclic shifts of an m-sequence employed for the S-PSS; or, $m=(n+X1)\bmod 127$, $CS=\{X1\}$, wherein X1 corresponds to an index value $N_{ID}^{(2)}$ of the S-PSS sequence, and X1 corresponds to a cyclic shift of an m-sequence employed for the S-PSS; or, $m=(n+\{X2,X3\})\bmod 127$, $CS=\{X2,X3\}$, wherein X2 and X3 correspond to two index values $N_{ID}^{(2)}$ of the S-PSS sequence, respectively, and X2 and X3 correspond to two cyclic shifts of an m-sequence employed for the S-PSS, respectively; or, $m=(n+\{X4,X5,X6\})\bmod 127$, $CS=\{X4,X5,X6\}$, wherein X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively;

or, wherein when $x(m)$ is generated based on the polynomial $x(i+7)=(x(i+1)+x(i))\bmod 2$, a value of m is taken in one of following ways:

$m=(n+43\times N_{ID}^{(2)}+d1)\bmod 127$, $CS=43\times N_{ID}^{(2)}+d1$, wherein $N_{ID}^{(2)}$ is an index value of the S-PSS sequence, d1 is a positive integer; or, $m=(n+(43+d2)\times N_{ID}^{(2)}+d3)\bmod 127$, $CS=(43+d2)\times N_{ID}^{(2)}+d3$, wherein $N_{ID}^{(2)}$ is an index value of the S-PSS sequence, both d2 and d3 are positive integers; or, $m=(n+(43-d4)\times N_{ID}^{(2)}+d5)\bmod 127$, $CS=(43-d4)\times N_{ID}^{(2)}+d5$, wherein $N_{ID}^{(2)}$ is an index value of the S-PSS sequence, both d4 and d5 are positive integers; or, $m=(n+43\times(N_{ID}^{(2)}+d6))\bmod 127$, $CS=43\times(N_{ID}^{(2)}+d6)$, wherein $N_{ID}^{(2)}$ is an index value of the S-PSS sequence, d6 is a positive integer; or, $m=(n+43\times\{N1,N2\})\bmod 127$, $CS=43\times\{N1,N2\}$, wherein N1 and N2 correspond to two index values $N_{ID}^{(2)}$ of the S-PSS sequence, and N1 and N2 correspond to two cyclic shifts of an m-sequence employed for the side-link-primary synchronization signal; or, $m=(n+X1)\bmod 127$, $CS=\{X1\}$, wherein X1 corresponds to an index value $N_{ID}^{(2)}$ of the S-PSS sequence, and X1 corresponds to a cyclic shift of an m-sequence employed for the sidelink-primary synchronization signal; or, $m=(n+\{X2,X3\})\bmod 127$, $CS=\{X2,X3\}$, wherein X2 and X3 correspond to two index values $N_{ID}^{(2)}$ of the S-PSS sequence, respectively, and X2 and X3 correspond to two cyclic shifts of an m-sequence employed for the sidelink-primary synchronization signal, respectively; or, $m=(n+\{X4,X5,X6\})\bmod 127$, $CS=\{X4,X5,X6\}$, wherein X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively; or, $m=(n+d6\times N_{ID}^{(2)})\bmod 127$, $CS=d6\times N_{ID}^{(2)}$, wherein $N_{ID}^{(2)}$ is an index value of the S-PSS sequence, d6 is a positive integer.

2. The method according to claim 1, wherein the frequency resource comprises one or a combination of following resources:

a subcarrier, a resource block, a bandwidth part (BWP), a carrier, a frequency band.

3. A terminal, comprising:

a processor, configured to read programs in a memory and perform a following process:

generating a sidelink-primary synchronization signal (S-PSS) sequence according to a specific polynomial, and generating an S-PSS synchronization signal according to the S-PSS sequence;

a transceiver, configured to receive and transmit data under control of the processor and perform a following process:

transmitting the S-PSS synchronization signal;

wherein, generating the S-PSS sequence according to the specific polynomial comprises one or a combination of following:

generating an S-PSS sequence $d_{PSS}(n)$ according to a formula $d_{PSS}(n)=1-2x(m)$, wherein $x(m)$ is generated based on a polynomial $x(i+7)=(x(i+4)+x(i))\bmod 2$, $m=(n+CS)\bmod 127$, wherein $0\leq n<127$, n is a first sequence-numbering value, m is a second sequence-numbering value generated from n and CS, i is a third sequence-numbering value, CS is cyclic shift, and CS is a positive integer not equal to 0, 43 and 86; or, generating an S-PSS sequence $d_{PSS}(n)$ according to a formula $d_{PSS}(n)=1-2x(m)$, wherein $x(m)$ is generated based on a polynomial x(i+7)=(x(i+1)+x(i))mod 2, m=(n+CS)mod 127, wherein 0≤n<127, n is a first sequence-numbering value, m is a second sequence-numbering value generated from n and CS, i is a third sequence-numbering value, CS is cyclic shift; or, generating an S-PSS sequence $d_{PSS}(n)$ according to a formula $d_{PSS}(n)=d_u(n)$, wherein $$d_u(n) = \begin{cases} e^{-j\frac{\pi u n(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, wherein 0≤u<127; or transmitting the S-PSS synchronization signal on a frequency resource different from a frequency resource occupied by an air-interface downlink-primary synchronization signal (DL-PSS), wherein the air-interface DL-PSS is transmitted by a base station to a terminal, and the S-PSS is transmitted by a terminal to another terminal, wherein when x(m) is generated based on the polynomial x(i+7)=(x(i+4)+x(i))mod 2, m is taken in one of following ways:

m=(n+43×$N_{ID}^{(2)}$+d1)mod 127, CS=43×$N_{ID}^{(2)}$+d1, wherein $N_{ID}^{(2)}$ is an index value of the S-PSS sequence, d1 is a positive integer; or, m=(n+(43+d2)×$N_{ID}^{(2)}$+d3)mod 127, CS=(43+d2)×$N_{ID}^{(2)}$+d3, wherein $N_{ID}^{(2)}$ is an index value of the S-PSS sequence, both d2 and d3 are positive integers; or, m=(n+(43−d4)×$N_{ID}^{(2)}$+d5)mod 127, CS=(43−d4)×$N_{ID}^{(2)}$+d5, wherein $N_{ID}^{(2)}$ is an index value of the S-PSS sequence, both d4 and d5 are positive integers; or, m=(n+43×($N_{ID}^{(2)}$+d6))mod 127, CS=43×($N_{ID}^{(2)}$+d6), wherein $N_{ID}^{(2)}$ is an index value of the S-PSS sequence, d6 is a positive integer; or, m=(n+43×{N1,N2})mod 127, CS=43×{N1,N2}, wherein N1 and N2 correspond to two index values $N_{ID}^{(2)}$ of the S-PSS sequence, and N1 and N2 correspond to two cyclic shifts of an m-sequence employed for the sidelink-primary synchronization signal; or, m=(n+X1)mod 127, CS={X1}, wherein X1 corresponds to an index value $N_{ID}^{(2)}$ of the S-PSS sequence, and X1 corresponds to a cyclic shift of an m-sequence employed for the S-PSS; or, m=(n+{X2,X3})mod 127, CS={X2,X3}, wherein X2 and X3 correspond to two index values $N_{ID}^{(2)}$ of the S-PSS sequence, respectively, and X2 and X3 correspond to two cyclic shifts of an m-sequence employed for the sidelink-primary synchronization signal, respectively; or, m=(n+{X4,X5,X6})mod 127, CS={X4,X5,X6}, wherein X4, X5 and X6 correspond to three index values $N_{ID}^{(2)}$ of the S-PSS sequence, respectively, and X4, X5 and X6 correspond to three cyclic shifts of an m-sequence employed for the sidelink-primary synchronization signal, respectively or, when x(m) is generated based on the polynomial x(i+7)=(x(i+1)+x(i))mod 2, a value of m is taken in one of following ways:

m=(n+43×$N_{ID}^{(2)}$+d1)mod 127, CS=43×$N_{ID}^{(2)}$+d1, wherein $N_{ID}^{(2)}$ is an index value of the S-PSS sequence, d1 is a positive integer; or, m=(n+(43+d2)×$N_{ID}^{(2)}$+d3)mod 127, CS=(43+d2)×$N_{ID}^{(2)}$+d3, wherein $N_{ID}^{(2)}$ is an index value of the S-PSS sequence, both d2 and d3 are positive integers; or, m=(n+(43−d4)×$N_{ID}^{(2)}$+d5)mod 127, CS=(43−d4)×$N_{ID}^{(2)}$+d5, wherein $N_{ID}^{(2)}$ is an index value of the S-PSS sequence, both d4 and d5 are positive integers; or, m=(n+43×($N_{ID}^{(2)}$+d6))mod 127, CS=43×($N_{ID}^{(2)}$+d6), wherein $N_{ID}^{(2)}$ is an index value of the S-PSS sequence, d6 is a positive integer; or, m=(n+43×{N1,N2})mod 127, CS=43×{N1,N2}, wherein N1 and N2 correspond to two index values $N_{ID}^{(2)}$ of the S-PSS sequence, and N1 and N2 correspond to two cyclic shifts of an m-sequence employed for the sidelink-primary synchronization signal; or, m=(n+X1)mod 127, CS={X1}, wherein X1 corresponds to an index value $N_{ID}^{(2)}$ of the S-PSS sequence, and X1 corresponds to a cyclic shift of an m-sequence employed for the sidelink-primary synchronization signal; or, m=(n+{X2,X3})mod 127, CS={X2,X3}, wherein X2 and X3 correspond to two index values $N_{ID}^{(2)}$ of the S-PSS sequence, respectively, and X2 and X3 correspond to two cyclic shifts of an m-sequence employed for the sidelink-primary synchronization signal, respectively; or, m=(n+{X4,X5,X6})mod 127, CS={X4,X5,X6}, wherein X4, X5 and X6 correspond to three index values $N_{ID}^{(2)}$ of the S-PSS sequence, respectively, and X4, X5 and X6 correspond to three cyclic shifts of an m-sequence employed for the sidelink-primary synchronization signal, respectively; or, m=(n+d6×$N_{ID}^{(2)}$)mod 127, CS=d6×$N_{ID}^{(2)}$, wherein $N_{ID}^{(2)}$ is an index value of the S-PSS sequence, d6 is a positive integer.

4. The terminal according to claim 3, wherein the frequency resource comprises one or a combination of following resources:
a subcarrier, a resource block, a bandwidth part (BWP), a carrier, a frequency band.

5. A non-transitory computer readable storage medium storing thereon a computer program, wherein when the computer program is executed by a processor, the processor implements a method of transmitting the synchronization signal, the method comprises:

generating a sidelink-primary synchronization signal (S-PSS) sequence according to a specific polynomial, and generating an S-PSS synchronization signal according to the S-PSS sequence;

transmitting the S-PSS synchronization signal; wherein, generating the S-PSS sequence according to the specific polynomial comprises one or a combination of following:

generating an S-PSS sequence $d_{PSS}(n)$ according to a formula $d_{PSS}(n)=1-2x(m)$, wherein x(m) is generated based on a polynomial x(i+7)=(x(i+4)+x(i))mod 2, m=(n+CS)mod 127, wherein 0≤n<127, n is a first sequence-numbering value, m is a second sequence-numbering value generated from n and CS, i is a third sequence-numbering value, CS is cyclic shift, and CS is a positive integer not equal to 0, 43 and 86; or, generating an S-PSS sequence $d_{PSS}(n)$ according to a formula $d_{PSS}(n)=1-2x(m)$, wherein x(m) is generated based on a polynomial x(i+7)=(x(i+1)+x(i))mod 2, m=(n+CS)mod 127, wherein 0≤n<127, n is a first sequence-numbering value, m is a second sequence-numbering value generated from n and CS, i is a third sequence-numbering value, CS is cyclic shift; or, generating an S-PSS sequence $d_{PSS}(n)$ according to a formula $d_{PSS}(n)=d_u(n)$, wherein $$d_u(n) = \begin{cases} e^{-j\frac{\pi un(n+1)}{127}} & n = 0, 1, \ldots, 62 \\ e^{-j\frac{\pi u(n+1)(n+2)}{127}} & n = 63, 32, \ldots, 125 \end{cases}$$

u is a root sequence index, wherein $0 \leq u < 127$; or transmitting the S-PSS synchronization signal on a frequency resource different from a frequency resource occupied by an air-interface downlink-primary synchronization signal (DL-PSS), wherein the air-interface DL-PSS is transmitted by a base station to a terminal, and the S-PSS is transmitted by a terminal to another terminal, wherein when x(m) is generated based on the polynomial $x(i+7)=(x(i+4)+x(i)) \bmod 2$, a value of m is taken in one of following ways:

m=(n+43×$N_{ID}^{(2)}$+d1)mod 127, CS=43×$N_{ID}^{(2)}$+d1, wherein $N_{ID}^{(2)}$ is an index value of the S-PSS sequence, d1 is a positive integer; or, m=(n+(43+d2)×$N_{ID}^{(2)}$+d3)mod 127, CS=(43+d2)×$N_{ID}^{(2)}$+d3, wherein $N_{ID}^{(2)}$ is an index value of the S-PSS sequence, both d2 and d3 are positive integers; or, m=(n+(43−d4)×$N_{ID}^{(2)}$+d5)mod 127, CS=(43−d4)×$N_{ID}^{(2)}$+d5, wherein $N_{ID}^{(2)}$ is an index value of the S-PSS sequence, both d4 and d5 are positive integers; or, m=(n+43×($N_{ID}^{(2)}$+d6))mod 127, CS=43×($N_{ID}^{(2)}$+d6), wherein $N_{ID}^{(2)}$ is an index value of the S-PSS sequence, d6 is a positive integer; or, m=(n+43×{N1,N2})mod 127, CS=43×{N1,N2}, wherein N1 and N2 correspond to two index values $N_{ID}^{(2)}$ of the S-PSS sequence, and N1 and N2 correspond to two cyclic shifts of an m-sequence employed for the S-PSS; or, m=(n+X1)mod 127, CS={X1}, wherein X1 corresponds to an index value $N_{ID}^{(2)}$ of the S-PSS sequence, and X1 corresponds to a cyclic shift of an m-sequence employed for the S-PSS; or, m=(n+{X2,X3})mod 127, CS={X2,X3}, wherein X2 and X3 correspond to two index values $N_{ID}^{(2)}$ of the S-PSS sequence, respectively, and X2 and X3 correspond to two cyclic shifts of an m-sequence employed for the S-PSS, respectively; or, m=(n+{X4,X5,X6})mod 127, CS={X4,X5,X6}, wherein X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively;

or, wherein when x(m) is generated based on the polynomial $x(i+7)=(x(i+1)+x(i)) \bmod 2$, a value of m is taken in one of following ways:

m=(n+43×$N_{ID}^{(2)}$+d1)mod 127, CS=43×$N_{ID}^{(2)}$+d1, wherein $N_{ID}^{(2)}$ is an index value of the S-PSS sequence, d1 is a positive integer; or, m=(n+(43+d2)×$N_{ID}^{(2)}$+d3)mod 127, CS=(43+d2)×$N_{ID}^{(2)}$+d3, wherein $N_{ID}^{(2)}$ is an index value of the S-PSS sequence, both d2 and d3 are positive integers; or, m=(n+(43−d4)×$N_{ID}^{(2)}$+d5)mod 127, CS=(43−d4)×$N_{ID}^{(2)}$+d5, wherein $N_{ID}^{(2)}$ is an index value of the S-PSS sequence, both d4 and d5 are positive integers; or, m=(n+43×($N_{ID}^{(2)}$+d6))mod 127, CS=43×($N_{ID}^{(2)}$+d6), wherein $N_{ID}^{(2)}$ is an index value of the S-PSS sequence, d6 is a positive integer; or, m=(n+43×{N1,N2})mod 127, CS=43×{N1,N2}, wherein N1 and N2 correspond to two index values $N_{ID}^{(2)}$ of the S-PSS sequence, and N1 and N2 correspond to two cyclic shifts of an m-sequence employed for the sidelink-primary synchronization signal; or, m=(n+X1)mod 127, CS={X1}, wherein X1 corresponds to an index value $N_{ID}^{(2)}$ of the S-PSS sequence, and X1 corresponds to a cyclic shift of an m-sequence employed for the sidelink-primary synchronization signal; or, m=(n+{X2,X3})mod 127, CS={X2,X3}, wherein X2 and X3 correspond to two index values $N_{ID}^{(2)}$ of the S-PSS sequence, respectively, and X2 and X3 correspond to two cyclic shifts of an m-sequence employed for the sidelink-primary synchronization signal, respectively; or, m=(n+{X4,X5,X6})mod 127, CS={X4,X5,X6}, wherein X4, X5 and X6 correspond to three index values $N_{ID}^{(2)}$ of the S-PSS sequence, respectively, and X4, X5 and X6 correspond to three cyclic shifts of an m-sequence employed for the S-PSS, respectively; or, m=(n+d6×$N_{ID}^{(2)}$)mod 127, CS=d6×$N_{ID}^{(2)}$, wherein $N_{ID}^{(2)}$ is an index value of the S-PSS sequence, d6 is a positive integer.

6. The non-transitory computer readable storage medium according to claim 5, wherein the frequency resource comprises one or a combination of following resources:
a subcarrier, a resource block, a bandwidth part (BWP), a carrier, a frequency band.

* * * * *